United States Patent
Kim et al.

(10) Patent No.: US 9,173,237 B2
(45) Date of Patent: Oct. 27, 2015

(54) COMMUNICATION METHOD OF RELAY, TERMINAL, AND COMMUNICATION METHOD OF THE TERMINAL

(71) Applicants: ELECTRONICS AND TELECOMMUNICATIONS RESEARCH INSTITUTE, Daejeon (KR); Industry-Academic Cooperation Foundation, Chosun University, Gwangju (KR)

(72) Inventors: Won-Ik Kim, Daejeon (KR); Eunkyung Kim, Daejeon (KR); Sung Kyung Kim, Daejeon (KR); Sung Cheol Chang, Daejeon (KR); Mi Young Yun, Daejeon (KR); Seokki Kim, Osan-si (KR); Hyun Lee, Daejeon (KR); Chul Sik Yoon, Seoul (KR); Kwang Jae Lim, Daejeon (KR); Seokjoo Shin, Gwangju (KR)

(73) Assignees: ELECTRONICS AND TELECOMMUNICATIONS RESEARCH INSTITUTE, Daejeon (KR); INDUSTRY-ACADEMIC COOPERATION FOUNDATION, CHOSUN UNIVERSITY, Gwangju (KR)

( * ) Notice: Subject to any disclaimer, the term of this patent is extended or adjusted under 35 U.S.C. 154(b) by 216 days.

(21) Appl. No.: 13/665,914

(22) Filed: Oct. 31, 2012

(65) Prior Publication Data

US 2013/0107795 A1    May 2, 2013

(30) Foreign Application Priority Data

Nov. 1, 2011   (KR) .......................... 10-2011-0112964
Sep. 25, 2012   (KR) .......................... 10-2012-0106634

(51) Int. Cl.
*H04B 7/14*    (2006.01)
*H04W 76/00*    (2009.01)
(Continued)

(52) U.S. Cl.
CPC ............ *H04W 76/007* (2013.01); *H04W 88/04* (2013.01); *H04W 88/08* (2013.01)

(58) Field of Classification Search
USPC .................................. 370/315, 328, 338, 401
See application file for complete search history.

(56) References Cited

U.S. PATENT DOCUMENTS 7,668,504 B2 *   2/2010   Kang et al. ................... 455/11.1
8,355,356 B2 *   1/2013   Youn et al. ................... 370/315

(Continued)

FOREIGN PATENT DOCUMENTS

KR    2008-0034263 A    4/2008
KR    2010-0023718 A    3/2010

OTHER PUBLICATIONS

Seokjoo Shin et al., "Synchronization control for HR-MS acting as relay in GRIDMAN AWD for 802.16.1a," IEEE 802.16 Broadband Wireless Access Working Group, IEEE C802.16n-11/0248, Nov. 8, 2011.

(Continued)

*Primary Examiner* — Ricky Ngo
*Assistant Examiner* — Christine Ng
(74) *Attorney, Agent, or Firm* — Rabin & Berdo, P.C.

(57) ABSTRACT

A relay, a terminal, and a communication method of the same are provided. The terminal acting as a relay receives a message including scan duration information from a superordinate HR-BS, and the terminal transmits a message including the scan duration information to a subordinate HR-MS. The terminal receives an A-preamble from the superordinate HR-BS according to the scan duration information.

9 Claims, 4 Drawing Sheets

(51) Int. Cl.
*H04W 88/04* (2009.01)
*H04W 88/08* (2009.01)

(56) References Cited

U.S. PATENT DOCUMENTS

| | | | |
|---|---|---|---|
| 2008/0235048 A1* | 9/2008 | Rantanen et al. | 705/1 |
| 2010/0008246 A1* | 1/2010 | Watanabe | 370/252 |
| 2011/0211521 A1 | 9/2011 | Baba et al. | |
| 2011/0230187 A1* | 9/2011 | Jeon et al. | 455/434 |
| 2011/0261749 A1 | 10/2011 | Youn et al. | |
| 2011/0268016 A1* | 11/2011 | Youn et al. | 370/315 |
| 2012/0094664 A1* | 4/2012 | Jung et al. | 455/434 |
| 2012/0315841 A1* | 12/2012 | Zhou et al. | 455/11.1 |
| 2013/0034030 A1* | 2/2013 | Chun et al. | 370/281 |

OTHER PUBLICATIONS

"802.16n Amendment Working Draft," IEEE 802.16 Broadband Wireless Access Working Group, IEEE 802.16n-11/0009r1, May 27, 2011.

IEEE Computer Society et al., IEEE Standard for Local and metropolitan area networks; Part 16: Air Interface for Broadband Wireless Access Systems; Amendment 3: Advanced Air Interface, IEEE Std 802.16mTM-2011, May 6, 2011.

\* cited by examiner

COMMUNICATION METHOD OF RELAY, TERMINAL, AND COMMUNICATION METHOD OF THE TERMINAL

CROSS-REFERENCE TO RELATED APPLICATION

This application claims priority to and the benefit of Korean Patent Application No. 10-2011-0112964 and 10-2012-0106634 filed in the Korean Intellectual Property Office on Nov. 1, 2011 and Sep. 25, 2012, the entire contents of which are incorporated herein by reference.

BACKGROUND OF THE INVENTION (a) Field of the Invention

The present invention relates to a communication method of a relay, a terminal, and a communication method of the terminal.

(b) Description of the Related Art

When a disaster or a calamity occurs, an important social infrastructure may be destroyed or damaged. Various communication facilities such as a wireless phone, a wired phone, and an Internet network are part of the important social infrastructure, and when such communication facilities are destroyed or damaged, social congestion increases and security of society recovery may be difficult.

Therefore, even in such a situation, a high reliability support that provides a method that can quickly restore or replace a communication facility is important.

Particularly, as a base station that performs a central function of communication using a mobile terminal is damaged or as a power line is destroyed, when the base station does not perform a function thereof, a service unavailable area may occur.

Therefore, it is necessary to provide a means that can provide a wireless communication service in a service unavailable area due to damage of a base station.

SUMMARY OF THE INVENTION

The present invention has been made in an effort to provide a communication method of a relay, a terminal, and a communication method of the terminal having advantages of continuing to provide a wireless communication service even when a base station is damaged.

An exemplary embodiment of the present invention provides a communication method of a terminal. The communication method includes: being selected as a high reliability mobile station (HR-MS) acting as a relay; receiving a first message including scan duration information from a superordinate high reliability base station (HR-BS); transmitting a second message including the scan duration information to a subordinate HR-MS that receives a service, as a temporary network is constructed by the HR-MS; and receiving an A-preamble from the superordinate HR-BS according to the scan duration information.

The communication method may further include transmitting a third message that requests the scan duration information to the superordinate HR-BS.

The receiving of a first message may include receiving the first message from the superordinate HR-BS, when the HR-MS performs network entry to the superordinate HR-BS.

The first message and the second message may include a field of the scan duration, a start superframe index field, a start frame index field, and an interleaving interval field.

The third message may include a scan duration control field and a time interval control field.

The transmitting of a second message may include transmitting the second message to the subordinate HR-MS, when a scanning request message is received from the subordinate HR-MS.

The HR-MS may operate in a TTR relay mode.

Another embodiment of the present invention provides a communication method of a relay. The communication method includes: being selecting, when a problem exists in an HR-BS, as a relay that relays between a subordinate HR-MS of the HR-BS and the HR-BS; receiving a first message including scan duration information from the HR-BS; transmitting a second message including the scan duration information to the subordinate HR-MS; and receiving an A-preamble from the HR-BS according to the scan duration information.

The communication method may further include transmitting a message that requests the scan duration information to the HR-BS.

The receiving of a first message may include receiving the first message from the HR-BS, when the relay performs network entry to the HR-BS.

The first message and the second message may include a field of the scan duration, a start superframe index field, a start frame index field, and an interleaving interval field.

Yet another embodiment of the present invention provides a terminal. The terminal includes: a radio frequency (RF) module; and a processor that is connected to the RF module, wherein the processor enables transmitting a message including scan duration information to a subordinate HR-MS and receiving an A-preamble from the superordinate HR-BS according to the scan duration information, when the terminal is selected as an HR-MS acting as a relay and receives a request for scan duration information from the superordinate HR-BS.

The processor may enable requesting of the scan duration information to the superordinate HR-BS.

The message may include a field of the scan duration, a start superframe index field, a start frame index field, and an interleaving interval field.

According to an exemplary embodiment of the present invention, an HR-MS acting as a relay or a separate mobile relay constructs a temporary network in a service unavailable area and can thus continue to provide a communication service to subordinate HR-MSs.

According to an exemplary embodiment of the present invention, even if a mobile relay or an HR-MS acting as a relay is moving or is positioned indoors, the mobile relay or the HR-MS acting as a relay corresponds an A-preamble to a superordinate HR-BS and can thus perform a normal operation.

DETAILED DESCRIPTION OF THE EMBODIMENTS

Figure 1:
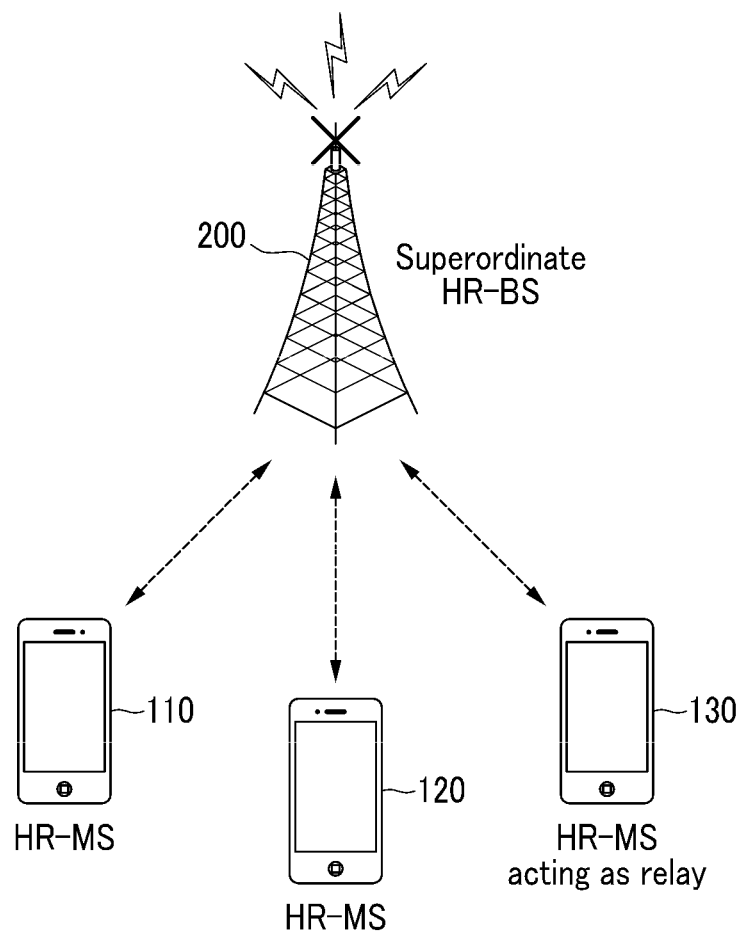
FIG. 1 is a diagram illustrating a damaged base station in a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a mobile station (MS) may indicate a terminal, a mobile terminal (MT), a mobile station (MS), an advanced mobile station (AMS), a high reliability mobile station (HR-MS), a subscriber station (SS), a portable subscriber station (PSS), an access terminal (AT), and user equipment (UE), and may include an entire function or a partial function of the terminal, the MT, the AMS, the HR-MS, the SS, the PSS, the AT, and the UE.

Further, a base station (BS) may indicate an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that performs a BS function, and a high reliability relay station (HR-RS) that performs a BS function, and may include an entire function or a partial function of the ABS, the node B, the eNodeB, the AP, the RAS, the BTS, the MMR-BS, the RS, and the HR-RS.

Hereinafter, a communication method of a relay, a terminal, and a communication method of the terminal will be described in detail with reference to the drawings.

FIG. 1 is a diagram illustrating a damaged BS in a mobile communication system according to an exemplary embodiment of the present invention.

The mobile communication system according to an exemplary embodiment of the present invention includes an HR-BS 200 and subordinate HR-MSs 110, 120, and 130 within a cell in which the HR-BS 200 services. Here, the HR-BS 200 is a damaged HR-BS that does not appropriately perform a function of an HR-BS, and hereinafter, the HR-BS 200 is referred to as a superordinate high reliability base station (superordinate HR-BS).

When the superordinate HR-BS 200 is damaged, a service unavailable area occurs and thus the subordinate HR-MSs 110, 120, and 130 have a problem in performing a mobile communication service, but in an exemplary embodiment of the present invention, an HR-MS acting as a relay among the subordinate HR-MSs 110, 120, and 130 is selected. Hereinafter, an HR-MS that is selected as an HR-MS acting as a relay is referred to as a high reliability mobile station (HR-MS) acting as a relay. As an HR-MS acting as a relay 130 that is selected in this way acts as a relay, a temporary network is constructed and operated, and thus the subordinate HR-MSs 110, 120, and 130 continue to receive a service.

As described above, the HR-MS may act as a relay, but a separate mobile relay station (mobile RS) that communicates with the superordinate HR-BS 200 may construct and operate a temporary network. In FIG. 1, the mobile RS is not shown, but is positioned within a cell in which the superordinate HR-BS 200 services. The subordinate HR-MSs 110, 120, and 130 continue to receive a service by such a mobile RS.

Hereinafter, a mobile relay (mobile RS) or an HR-MS acting as a relay that constructs and operates a temporary network in this way is referred to as a mobile RS or an HR-MS acting as a relay.

A mobile RS or an HR-MS acting as a relay according to an exemplary embodiment of the present invention operates in a time division-transmit and receive (TTR) relay mode. In order for the mobile RS or the HR-MS acting as a relay operating in a TTR relay mode to construct and operate a temporary network, it is necessary that the mobile RS or the HR-MS acting as a relay corresponds an A-preamble to the superordinate HR-BS 200. When the mobile RS or the HR-MS acting as a relay performs network entry, the mobile RS or the HR-MS acting as a relay receives an A-preamble from the superordinate HR-BS 200. However, even if the mobile RS or the HR-MS acting as a relay moves or is positioned indoors, a method in which the mobile RS or the HR-MS acting as a relay receives an A-preamble from the superordinate HR-BS 200 through a relay link is necessary. That is, in a case other than when the mobile RS or the HR-MS acting as a relay performs network entry to the superordinate HR-BS 200, a method in which the mobile RS or the HR-MS acting as a relay receives an A-preamble from the superordinate HR-BS 200 through a relay link is necessary.

Hereinafter, a method and procedure in which a mobile RS or an HR-MS acting as a relay operating in a TTR relay mode receives an A-preamble from the superordinate HR-BS 200 through a relay link will be described.

A method in which the mobile RS or the HR-MS acting as a relay sets a relay link with the superordinate HR-BS 200 has been described in detail in an international standard conference IEEE 802.16n or IEEE 802.16m, and therefore a detailed description thereof will be omitted.

Figure 2:
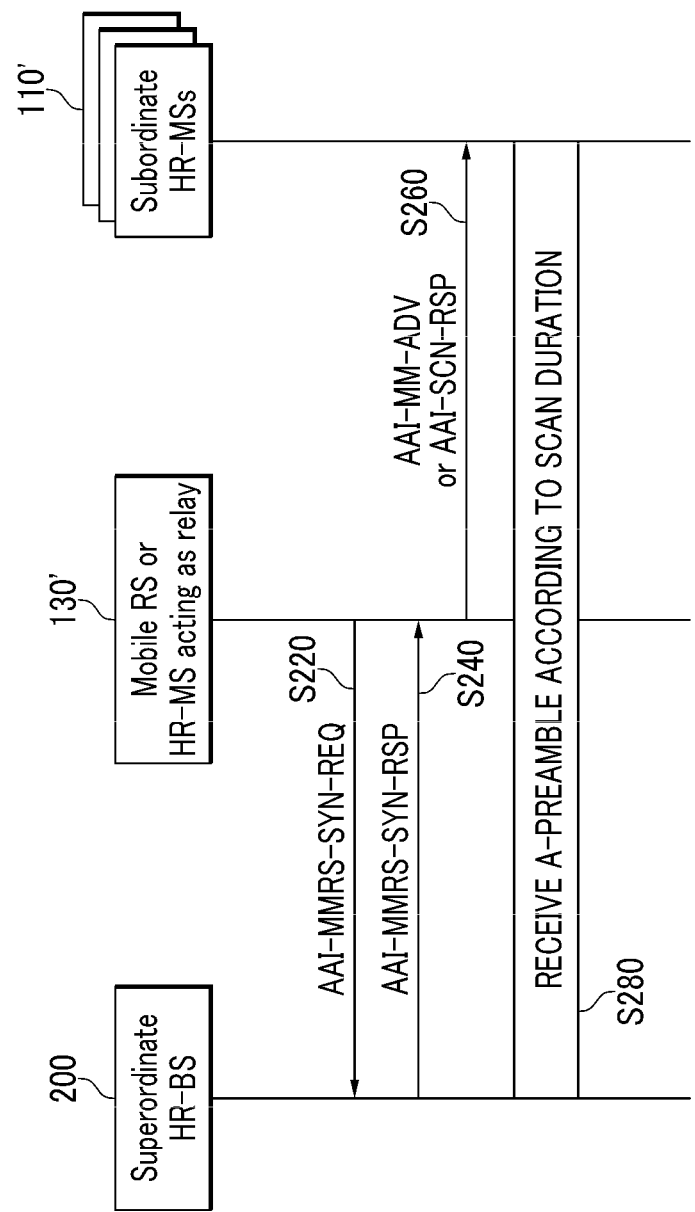
FIG. 2 is a flowchart illustrating a method in which a mobile RS or an HR-MS acting as a relay receives an A-preamble from a superordinate HR-BS according to an exemplary embodiment of the present invention.

FIG. 2 is a flowchart illustrating a method in which a mobile RS or an HR-MS acting as a relay receives an A-preamble from the superordinate HR-BS 200 according to an exemplary embodiment of the present invention. In FIG. 2, the mobile RS or the HR-MS acting as a relay is indicated by reference numeral 130' and a temporary network is constructed through the mobile RS or the HR-MS acting as a relay 130', and subordinate HR-MSs that continue to receive a service are indicated by 110'. The subordinate HR-MSs 110' correspond to the subordinate HR-MSs 110 and 120 of FIG. 1.

First, the mobile RS or the HR-MS acting as a relay 130' transmits an advanced air interface multimode relay synchronization request (AAI-MMRS-SYN-REQ) to the superordinate HR-BS 200 through a preset relay link (S220). The AAI-MMRS-SYN-REQ in which the mobile RS or the HR-MS acting as a relay 130' transmits includes contents that request and control a duration for receiving an A-preamble.

Table 1 represents a format of the AAI-MMRS-SYN-REQ. As shown in Table 1, the AAI-MMRS-SYN-REQ includes a scan duration control field and a time interval control field. The mobile RS or the HR-MS acting as a relay 130' controls the frequency for receiving an A-preamble from the superordinate HR-BS 200 through the AAI-MMRS-SYN-REQ including such a field.

For example, as a moving speed of the mobile RS or the HR-MS acting as a relay 130' is high or as the mobile RS or the HR-MS acting as a relay 130' is positioned indoors, an error of an A-preamble may frequently occur. In such a case, the mobile RS or the HR-MS acting as a relay 130' includes contents that request to set a longer scan duration and a shorter time interval in the AAI-MMRS-SYN-REQ, and transmits the AAI-MMRS-SYN-REQ to the superordinate HR-BS 200.

TABLE 1

AAI-MMRS-SYN-REQ Message Format

| Field | Size (bits) | Value/Description | Condition |
|---|---|---|---|
| Scan duration control | 1 | 0b0: Increase the time duration<br>0b1: Decrease the time duration | |
| Time interval control | 1 | 0b0: Increase the time interval<br>0b1: Decrease the time interval | |

The superordinate HR-BS 200, having received the AAI-MMRS-SYN-REQ message through a relay link, sets a scan duration to correspond to request information. That is, the superordinate HR-BS 200 sets a scan duration so that the mobile RS or the HR-MS acting as a relay 130' receives an A-preamble of the superordinate HR-BS 200 and tracks a synchronization timing offset. The superordinate HR-BS 200 transmits an advanced air interface multimode relay synchronization response (AAI-MMRS-SYN-RSP) including a scan duration to the mobile RS or the HR-MS acting as a relay 130' (S240).

Table 2 represents a format of the AAI-MMRS-SYN-RSP. As shown in Table 2, the AAI-MMRS-SYN-RSP includes a start superframe index field, a start frame index field, and an interleaving interval field, as well as a scan duration field. The mobile RS or the HR-MS acting as a relay 130', having received such an AAI-MMRS-SYN-RSP, receives an A-preamble from the superordinate HR-BS 200.

TABLE 2

AAI-MMRS-SYN-RSP Message Format

| Field | Size (bits) | Value/Description | Condition |
|---|---|---|---|
| Scan duration | 8 | Duration (in units of AAI subframe) of the requested scanning period. | |
| If(scan duration > 0){ | | | |
| Start superframe index | 6 | Represents the 6 least significant bits of the absolute superframe index in which the first scanning interval starts. | |
| Start frame index | 2 | Represents start frame number in the Start superframe number.<br>0b00: 1st frame in the superframe<br>0b01: 2nd frame in the superframe<br>0b10: 3rd frame in the super frame<br>0b11: 4th frame in the superframe | |
| Interleaving interval | 8 | The period of relay mode HR-MS's active mode (in units of AAI subframes) that is interleaved between scan durations. | |
| } //End if (Scan duration > 0) | | | |

The mobile RS or the HR-MS acting as a relay 130', having received the AAI-MMRS-SYN-RSP, transmits and notifies an advanced air interface multimode advertisement (AAI-MM-ADV) including scan duration information to the subordinate HR-MSs 110' thereof (S260).

Table 3 represents a format of the AAI-MM-ADV. As shown in Table 3, the AAI-MM-ADV includes a scan duration field, a start superframe index field, a start frame index field, and an interleaving interval field. Table 3 is adjusted to include and apply the AAI-MM-ADV message format that is defined to an IEEE 802.16m specification in contents of an exemplary embodiment of the present invention. That is, parameters of Table 3 are added to a parameter of the AAI-MM-ADV in existing IEEE 802.16m.

TABLE 3

AAI-MM-ADV Message Format

| Field | Size (bits) | Value/Description | Condition |
|---|---|---|---|
| Action Type | 4 | Used to indicate the purpose of this message<br>0b1000: Scanning operation for HR-MS acting as relay to maintain synchronization with the serving HR-BS<br>0b1001-0b1111: reserved | |
| ... | | | |
| | | | } else if (Action Type == 0b1000) { |
| Scan duration | 8 | Duration (in units of AAI subframe) of the requested scanning period. | |
| Interleaving interval | 8 | The period of relay mode HR-MS's active mode (in units of AAI subframes) that is interleaved between scan durations. | |
| Start superframe index | 6 | Represents the 6 least significant bits of the absolute superframe index in which the first scanning interval starts. | |
| Start frame index | 2 | Represents start frame number in the Start super frame number.<br>0b00: 1st frame in the superframe<br>0b01: 2nd frame in the superframe<br>0b10: 3rd frame in the superframe<br>0b11: 4th frame in the superframe | |
| | | | } |
| ... | | | |

In this method, the reason why the mobile RS or the HR-MS acting as a relay 130' transmits the AAI-MM-ADV to the subordinate HR-MSs 110' thereof is described as follows. For a duration in which the mobile RS or the HR-MS acting as a relay 130' receive an A-preamble from the superordinate HR-BS 200, the mobile RS or the HR-MS acting as a relay 130' cannot communicate with the subordinate HR-MSs 110'. Therefore, as the mobile RS or the HR-MS acting as a relay 130' transmits the AAI-MM-ADV to the subordinate HR-MSs 110', when the mobile RS or the HR-MS acting as a relay 130' receives an A-preamble, the mobile RS or the HR-MS acting as a relay 130' guides the subordinate HR-MSs 110' to perform scanning. That is, in a duration in which the mobile RS or the HR-MS acting as a relay 130' receive an A-preamble, communication between the subordinate HR-MSs 110' and the mobile RS or the HR-MS acting as a relay 130' is stopped and thus an erroneous operation is prevented from occurring.

In the foregoing description, the mobile RS or the HR-MS acting as a relay 130' notifies the subordinate HR-MSs 110' of scanning through the AAI-MM-ADV, but transmits with an unicast method through a general advanced air interface scan request (AAI-SCN-REQ) and advanced air interface scan response (AAI-SCN-RSP) for the subordinate HR-MSs 110' instead of the AAI-MM-ADV. That is, when the subordinate HR-MSs 110' transmit the AAI-SCN-REQ to the mobile RS or the HR-MS acting as a relay 130', the mobile RS or the HR-MS acting as a relay 130' transmits the AAI-SCN-RSP including information of Table 3 to the subordinate HR-MSs 110'.

After the mobile RS or the HR-MS acting as a relay 130' transmits the AAI-MM-ADV or the AAI-SCN-RSP to the subordinate HR-MSs 110', the mobile RS or the HR-MS acting as a relay 130' receives an A-preamble from the superordinate HR-BS 200 and tracks timing offset according to a scan duration that is set by the superordinate HR-BS 200

(S280). The subordinate HR-MSs 110' perform scanning according to a scan duration (S280).

The superordinate HR-BS 200 may not receive the AAI-MMRS-SYN-REQ and may transmit only the AAI-MMRS-SYN-RSP to the mobile RS or the HR-MS acting as a relay 130'. Hereinafter, this will be described with reference to FIG. 3.

Figure 3:
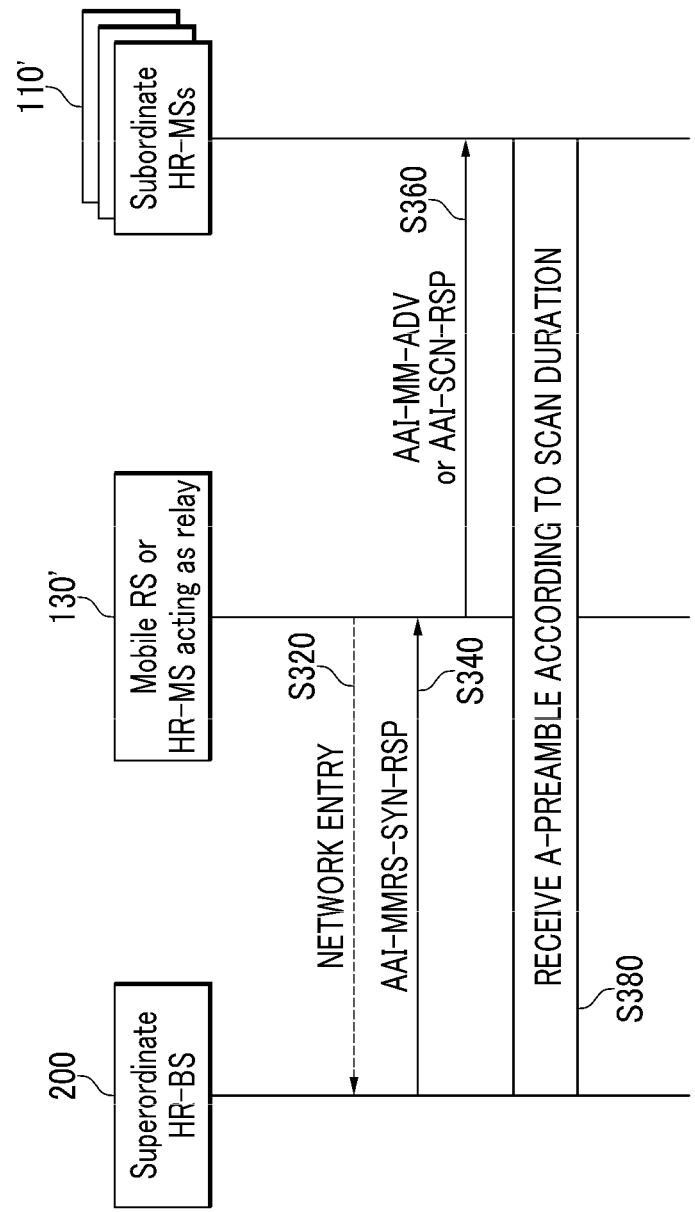
FIG. 3 is a flowchart illustrating a method in which a mobile RS or an HR-MS acting as a relay receives an A-preamble from a superordinate HR-BS according to another exemplary embodiment of the present invention.

FIG. 3 is a flowchart illustrating a method in which the mobile RS or the HR-MS acting as a relay 130' receives an A-preamble from the superordinate HR-BS 200 according to another exemplary embodiment of the present invention.

As shown in FIG. 3, when the mobile RS or the HR-MS acting as a relay 130' performs network entry to the superordinate HR-BS 200 (S320), the superordinate HR-BS 200 transmits the same AAI-MMRS-SYN-RSP as that of Table 2 to the mobile RS or the HR-MS acting as a relay 130'. That is, the superordinate HR-BS 200 transmits only the AAI-MMRS-SYN-RSP to the mobile RS or the HR-MS acting as a relay 130' even without receiving the AAI-MMRS-SYN-REQ, thereby setting an initial value for receiving an A-preamble.

Next, the mobile RS or the HR-MS acting as a relay 130' transmits and notifies the AAI-MM-ADV or the AAI-SCN-RSP to the subordinate HR-MSs 110' (S360), similar to a case of FIG. 2.

Similar to a case of FIG. 2, the mobile RS or the HR-MS acting as a relay 130' receives an A-preamble from the superordinate HR-BS 200 and tracks timing offset according to a scan duration that is set by the superordinate HR-BS 200 (S380). The subordinate HR-MSs 110' perform scanning according to a scan duration (S380).

According to such an exemplary embodiment of the present invention, the mobile RS or the HR-MS acting as a relay 130' operating in a TTR relay mode receives an A-preamble from the superordinate HR-BS 200. Thereby, even if the mobile RS or the HR-MS acting as a relay 130' is moving or is positioned indoors, the mobile RS or the HR-MS acting as a relay 130' corresponds an A-preamble to the superordinate HR-BS 200 and thus performs a normal operation.

Figure 4:
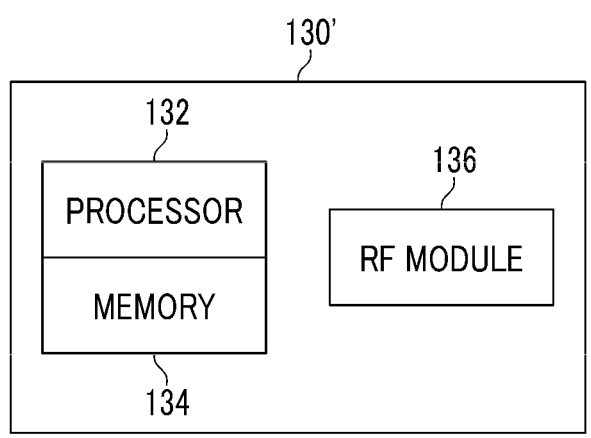
FIG. 4 is a block diagram illustrating a configuration of a mobile RS or an HR-MS acting as a relay according to an exemplary embodiment of the present invention.

FIG. 4 is a block diagram illustrating a configuration of a mobile RS or an HR-MS acting as a relay 130' according to an exemplary embodiment of the present invention.

Referring to FIG. 4, the mobile RS or the HR-MS acting as a relay 130' includes a processor 132, a memory 134, and a radio frequency (RF) module 136. The processor 132 is formed to perform the above-described procedure and method. The memory 134 is connected to the processor 132 and stores various information that is related to operation of the processor 132. The RF module 136 is connected to the processor 132 and transmits or receives a wireless signal. The mobile RS or the HR-MS acting as a relay 130' may have a single antenna or multiple antennas.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A communication method of a terminal, the communication method comprising:
   being selected as a high reliability mobile station (HR-MS) acting as a relay;
   transmitting an advanced air interface multimode relay synchronization request (AAI-MMRS-SYN-REQ) to a superordinate high reliability base station (HR-BS) through a preset relay link, wherein the selected HR-MS includes contents in the AAI-MMRS-SYN-REQ to set a scan duration and a time interval based on a moving speed of the selected HR-MS;
   receiving, from the HR-BS, an advanced air interface multimode relay synchronization response (AAI-MMRS-SYN-RSP), wherein the AAI-MMRS-SYN-RSP sets a scan duration corresponding to the AAI-MMRS-SYN-REQ;
   based on the scan duration set by the AAI-MMRS-SYN-RSP, receiving an A-preamble of the HR-BS and tracking a synchronization timing offset; and
   after receiving the AAI-MMRS-SYN-RSP, transmitting an advanced air interface multimode advertisement (AAI-MM-ADV) including scan duration information to a subordinate HR-MS, wherein the scan duration transmitted to the subordinate HR-MS guides the subordinate HR-MS to perform scanning while the selected HR-MS receives the A-preamble.

2. The communication method of claim 1, further comprising transmitting, in the AAI-MMRS-SYN-REQ, a message including:
   a scan duration control field configurable with one of a value to increase a time duration or a value to decrease the time duration; and
   a time interval control field configurable with one of a value to increase a time interval or a value to decrease the time interval.

3. The communication method of claim 2, further comprising receiving, in the AAI-MMRS-SYN-RSP, a message including:
   a scan duration field configurable with a value representing a duration of a requested scanning period;
   a start superframe index field configurable with a value representing an absolute superframe index in which a first scanning interval starts;
   a start frame index field configurable with a value representing a start frame number in a start superframe number; and
   an interleaving interval field configurable with a value representing a period of an active mode of the selected HR-MS that is interleaved between scan durations.

4. The communication method of claim 3, further comprising receiving, in the AAI-MM-ADV, a message including:
   an action type field configurable with a value representing a message purpose, the value representing the message purpose including an indication of a scanning operation for the selected HR-MS to maintain synchronization with the HR-BS;
   a scan duration field configurable with a value representing a duration of a requested scanning period;
   an interleaving interval field configurable with a value representing a period of an active mode of the selected HR-MS that is interleaved between scan durations;
   a start superframe index field configurable with a value representing an absolute superframe index in which a first scanning interval starts;
   a start frame index field configurable with a value representing a start frame number in a start superframe number.

5. The communication method of claim 1, wherein the HR-MS operates in a TTR relay mode.

6. A terminal, comprising:
   a radio frequency (RF) module; and
   a processor that is connected to the RF module, wherein the processor enables operations including
transmitting an advanced air interface multimode relay synchronization request (AAI-MMRS-SYN-REQ) to a superordinate high reliability base station (HR-BS) through a preset relay link, wherein the selected HR-MS includes contents in the AAI-MMRS-SYN-REQ to set a scan duration and a time interval based on a moving speed of the selected HR-MS;
receiving, from the HR-BS, an advanced air interface multimode relay synchronization response (AAI-MMRS-SYN-RSP), wherein the AAI-MMRS-SYN-RSP sets a scan duration corresponding to the AAI-MMRS-SYN-REQ;
based on the scan duration set by the AAI-MMRS-SYN-RSP, receiving an A-preamble of the HR-BS and tracking a synchronization timing offset; and
after receiving the AAI-MMRS-SYN-RSP, transmitting an advanced air interface multimode advertisement (AAI-MM-ADV) including scan duration information to a subordinate HR-MS, wherein the scan duration transmitted to the subordinate HR-MS guides the subordinate HR-MS to perform scanning while the selected HR-MS receives the A-preamble.

7. The terminal of claim 6, wherein the AAI-MMRS-SYN-REQ includes:
a scan duration control field configurable with one of a value to increase a time duration or a value to decrease the time duration; and
a time interval control field configurable with one of a value to increase a time interval or a value to decrease the time interval.

8. The terminal of claim 7, wherein the AAI-MMRS-SYN-RSP includes:
a scan duration field configurable with a value representing a duration of a requested scanning period;
a start superframe index field configurable with a value representing an absolute superframe index in which a first scanning interval starts;
a start frame index field configurable with a value representing a start frame number in a start superframe number; and
an interleaving interval field configurable with a value representing a period of an active mode of the selected HR-MS that is interleaved between scan durations.

9. The terminal of claim 8, wherein the AAI-MM-ADV includes:
an action type field configurable with a value representing a message purpose, the value representing the message purpose including an indication of a scanning operation for the selected HR-MS to maintain synchronization with the HR-BS;
a scan duration field configurable with a value representing a duration of a requested scanning period;
an interleaving interval field configurable with a value representing a period of an active mode of the selected HR-MS that is interleaved between scan durations;
a start superframe index field configurable with a value representing an absolute superframe index in which a first scanning interval starts;
a start frame index field configurable with a value representing a start frame number in a start superframe number.

* * * * *